US011690458B2

(12) United States Patent
Policicchio et al.

(10) Patent No.: US 11,690,458 B2
(45) Date of Patent: *Jul. 4, 2023

(54) UNITARY COMPONENT FOR SECTIONAL SEATING APPARATUS

(71) Applicant: Max Home, LLC, Fulton, MS (US)

(72) Inventors: Bruno Policicchio, Tulepo, MS (US); Joshua Silver, Boca Raton, FL (US)

(73) Assignee: Max Home, LLC, Fulton, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,975

(22) Filed: Oct. 13, 2021

(65) Prior Publication Data

US 2022/0022658 A1 Jan. 27, 2022

Related U.S. Application Data

(63) Continuation of application No. 16/778,569, filed on Jan. 31, 2020, now Pat. No. 11,166,565.

(60) Provisional application No. 62/799,733, filed on Jan. 31, 2019.

(51) Int. Cl.
*A47C 13/00* (2006.01)
*A47C 1/124* (2006.01)
*F16B 12/44* (2006.01)

(52) U.S. Cl.
CPC ............ *A47C 13/005* (2013.01); *A47C 1/124* (2013.01); *F16B 12/44* (2013.01)

(58) Field of Classification Search
None
See application file for complete search history.

(56) References Cited

U.S. PATENT DOCUMENTS

| 4,046,421 | A | 9/1977 | Spound et al. |
| 5,234,253 | A | 8/1993 | Lapointe et al. |
| 5,267,776 | A | 12/1993 | Fromson |
| 5,314,234 | A | 5/1994 | England |
| 5,326,153 | A | 7/1994 | Muffi |
| 5,544,938 | A | 8/1996 | Saul et al. |
| 6,629,729 | B2 | 10/2003 | Wiedeman et al. |
| 6,932,428 | B2 | 8/2005 | Murphy |
| 8,322,792 | B2 | 12/2012 | Chen |
| 8,783,778 | B2 | 7/2014 | Nelson et al. |
| 9,451,832 | B2 | 9/2016 | Chia |
| 11,457,745 | B1* | 10/2022 | Clabots ............... A47C 13/005 |
| 2003/0154660 | A1 | 8/2003 | Berkowicz |
| 2004/0095000 | A1* | 5/2004 | Durling ............... A47C 13/005 297/188.2 |
| 2009/0282663 | A1* | 11/2009 | Martin ................ A47B 83/001 29/281.5 |

(Continued)

FOREIGN PATENT DOCUMENTS

DE 3920283 A1 1/1991
FR 2746274 A1 9/1997

*Primary Examiner* — David E Allred
(74) *Attorney, Agent, or Firm* — Baker Donelson; Carl Davis (57) ABSTRACT

A frame for a unitary component of a sectional seating apparatus having a corner portion having a foundation and an elongate lateral portion having a foundation, interconnected by a longitudinal foundation member extending along a back side of the foundations and a transverse foundation member commonly supporting a side edge of the corner portion and supporting a side edge of the lateral portion intermediate opposing ends of the unitary component.

16 Claims, 9 Drawing Sheets

(56) References Cited

U.S. PATENT DOCUMENTS

| | | | |
|---|---|---|---|
| 2010/0327642 A1* | 12/2010 | Edwards | A47C 15/00 |
| | | | 297/232 |
| 2011/0101747 A1* | 5/2011 | Chen | A47C 17/045 |
| | | | 297/232 |
| 2016/0128486 A1* | 5/2016 | Chia | A47C 11/00 |
| | | | 297/440.14 |
| 2016/0174715 A1 | 6/2016 | Nelson et al. | |
| 2016/0206100 A1* | 7/2016 | Nelson | F16B 12/00 |
| 2016/0278529 A1* | 9/2016 | Paterson | A47C 4/03 |
| 2017/0071354 A1* | 3/2017 | Mezzera | A47C 4/028 |
| 2018/0242746 A1* | 8/2018 | Lawson | A47C 1/124 |
| 2020/0100030 A1 | 3/2020 | Neslon et al. | |
| 2021/0093087 A1 | 4/2021 | Zei et al. | |
| 2021/0196049 A1* | 7/2021 | McCreary | A47C 3/16 |
| 2022/0000266 A1* | 1/2022 | Nelson | A47C 13/005 |
| 2022/0133047 A1* | 5/2022 | Chen | A47C 17/163 |
| | | | 297/440.22 |

* cited by examiner

UNITARY COMPONENT FOR SECTIONAL SEATING APPARATUS

TECHNICAL FIELD

The present invention relates to furniture pieces for seating. More particularly, the present invention relates to a unitary modular component for joining to at least one other modular component for assembly of a sectional furniture seating apparatus.

BACKGROUND OF THE INVENTION

Sectional furniture pieces have become common in the furniture industry in recent years. Sectional furniture pieces are separate component furniture pieces that attach together to form an assembled or joined larger seating apparatus. These furniture pieces or modules are referenced in the industry as modular furniture, or sectionals, that are assembled with multiple pieces that join together. Sectional seating apparatus typically have a corner component, with one or more linear furniture pieces that attach to the corner component. The additional components may provide for example, an arm-less love seat component, a love seat with a one-arm end, and a day bed. Sectional seating apparatus are preferably use in larger rooms such as living rooms or dens of homes, lobbies of commercial buildings and the like. The corner component thereby provides an anchor to which other components attach. For example, a three piece sectional includes a left seating section, a corner seating section, and a right seating section. The sections connect together sequentially. The connection typically is accomplished with mating connectors that attach to respective opposing faces of the adjacent sections. Typically, a U-shaped receiving bracket attaches to a side face of one section and an outwardly disposed plate attaches to a side of the adjacent section. The bracket slidingly receives the plate to join the adjacent sections together.

Sectional components are provided for arranging in various configurations, including a corner seating area with an elongate love seat (smaller sofa) or chaise seating piece on one side, a corner seating area with a love seat portion having an arm portion that ends one side of the sectional furniture assembly, and a corner section that is configured for attaching expansion seating components on opposing ends.

Notwithstanding that the adjacent components join together and hide the attached faces from view during assembled use of the seating assembly, each component of the sectional seating assembly is essentially a separate piece of furniture. That is, the component has a perimeter foundation, cushion supports, padding, and upholstery. While upholstered sides are necessary for the observable sides of an assembled seating apparatus, the side faces of the adjacent components that join together are not readily visible or necessary for upholstery covering purposes in the assembled seating apparatus.

Accordingly, there is a need in the art for providing furniture components having reduced costs yet are readily assembled for sectional furniture seating apparatus. It is to such that the present invention is directed.

SUMMARY OF THE INVENTION

The present invention meets the needs in the art by providing a frame for a unitary component formed as a single permanent and rigid frame of a sectional seating apparatus, comprising a corner portion having foundation members including a front member and an end side member; and an elongate lateral portion having foundation members including a front member and an end side member. An interconnection connecting a respective opposing edge of the front member of the corner portion and the front member of the elongate lateral portion. A longitudinal foundation member spans along a back side of the foundation members of both the corner portion and the lateral portion. A transverse foundation member spanning from the back side to the interconnection commonly supports an interior side of the corner portion and an interior side of the elongate lateral portion. The transverse foundation member is intermediate and spaced from each of the end side member of the corner portion and the end side member of the elongate lateral portion to form the unitary component as the permanent and rigid frame.

In another aspect, the present invention provides a frame for a unitary component formed as a single permanent and rigid frame of a sectional seating apparatus comprising a back side member, a corner portion connected to the back side member and having foundation members and a corner portion exterior side, with a first width from the back side member to a corner portion front side and an elongate lateral portion connected to the back side member and having foundation members and a lateral portion exterior side opposing the corner portion exterior side with a second width from the back side to a lateral portion front side, the second width less than the first width. An interconnection connecting a respective opposing edge of the corner portion front side and the lateral portion front side. A transverse foundation member spanning from the back side member to the interconnection and commonly supporting an interior portion of the corner portion and an opposing interior portion of the elongate lateral portion. The transverse foundation member is intermediate and spaced from each of the corner portion exterior side and the lateral portion exterior side, whereby the corner portion and the elongate lateral portion adjoin together on the opposing interior portions to form a unitary component as a permanent and rigid frame.

Objects, advantages, and features of the present invention may be readily ascertained upon a reading of the following detailed description on conjunction with the drawings.

DETAILED DESCRIPTION

The present invention provides a unitary furniture component having reduced costs yet readily attaches as a corner component to at least a second furniture component piece for a sectional furniture seating apparatus.

Figure 1:
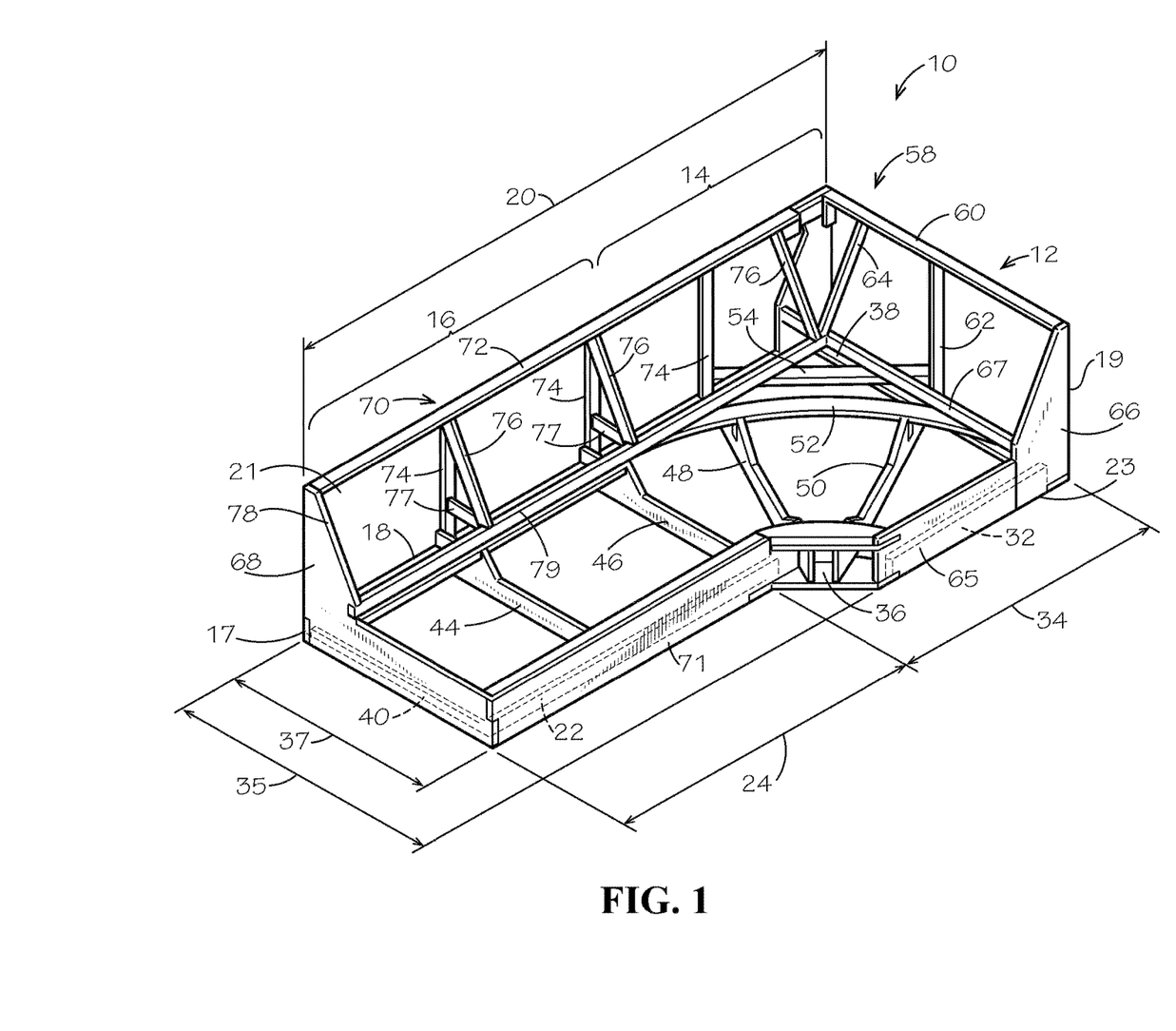
FIG. 1 illustrates in perspective view a frame for a first embodiment of a unitary component for a sectional seating apparatus in accordance with the present invention.
Figure 1A:
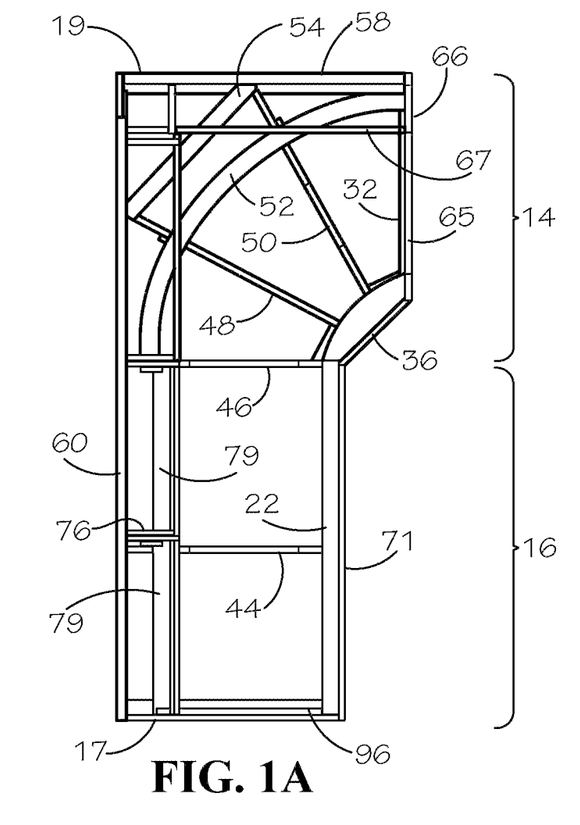
FIG. 1A illustrates in top plan view the frame shown in FIG. 1.
Figure 1B:
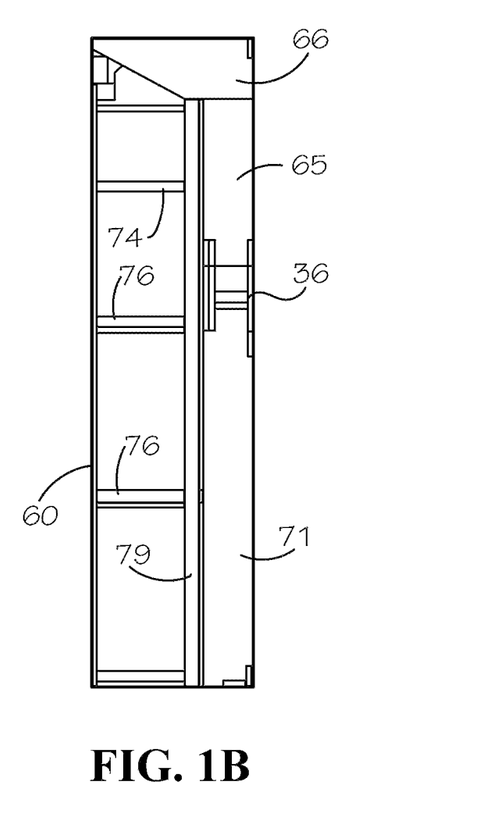
FIG. 1B illustrates in right side elevational view the frame shown in FIG. 1.

FIG. 1 illustrates in perspective view a frame 10 for a first embodiment of a unitary component 12 for a sectional seating apparatus in accordance with the present invention. The unitary component 12 includes a corner portion 14 and an elongate lateral portion 16 as shown also in top plan view in FIG. 1A. The unitary component 12 extends between opposing longitudinal ends 17, 19, and has a back side 21 and a front side 23. With continuing reference to FIG. 1, a back side elongate member 18 extends substantially a length 20 of the unitary component 12 spanning the corner portion 14 and the lateral portion 16. A first front side elongate member 22 extends a length 24 of the lateral portion 16 opposing a portion of the back side elongate member 18. A second front side elongate member 32 extends a length 34 of the corner portion 14 opposing a second portion of the back side elongate member 18. The corner portion 14 extends a first width 35 between the back side 21 and the front side 23. The lateral portion 16 extends a second width 37 between the back side 21 and the front side 23. The width 35 of the corner portion 14 is greater than the width 37 of the lateral portion 16. A bridge 36 interconnects interior opposing distal ends of the first and second elongate members 22, 32. An end elongate member 38 connects at the end 19 of the component 12 between the back side elongate member 18 and the second front side elongate member 32 to define the end 19 of the corner portion 14, as also shown in FIG. 1B. A second end elongate member 40 connects at the opposing end 17 of the component 12 between the back side elongate member 18 and the front side elongate member 22 to define the end 17 of the lateral portion 16, as also shown in partial cut-away view in FIG. 1C.

Foundation members 44, 46 connect in the lateral portion 16 between the back side elongate member 18 and the first front side elongate member 22. Radial foundation members 48, 50 are angularly spaced apart and connect in the corner portion 16 at a first end to the bridge 36 and extend to and connect to the back side elongate member 18 and the end elongate member 38. An arcuate support 52 connects in a rearward space of the corner portion 14 between diagonally opposing side portions (the bridge 36 and the back corner) and in engagement with the radial foundation members 48, 50 that hold the support 52. The illustrated embodiment alternatively optionally depicts a second diagonal support 54 rearwardly of the arcuate support 52 attached at respective opposing second side portions of the corner portion 14 (i.e., for example, to the back side elongate member 18 and the end elongate member 38).

Figure 1C:
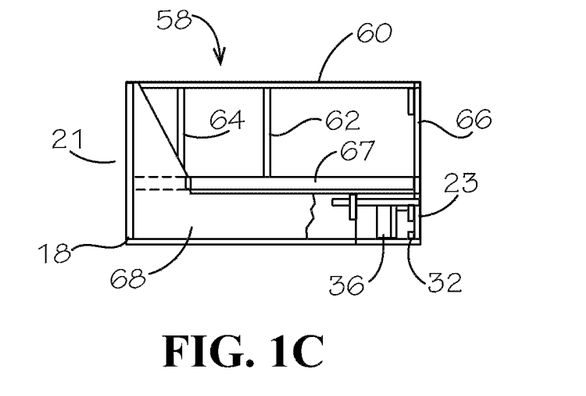
FIG. 1C illustrates in end elevational view the frame shown in FIG. 1.

An end frame 58 attaches to the corner portion 14 on the end 19 of the component 12. The end frame 58 is an A-shape framing of an upper member 60, at least one intermediate vertical post 62, and inwardly oriented opposing support members 64, 66. The support member 64 is an elongate member while the support member 66 is a planar sheet but may be an elongated member. A longitudinal member 67 extends between the back side 21 and the support member 66 on the front side 23. The end frame 58 supports foam bodies and padding (not illustrated) conventionally for seating cushions of a seating sectional furniture piece. FIG. 1B illustrates in front elevational view the end member 66 that in cooperation with a second front panel 65 defines a front panel that closes the front side 23 of the component 12. With reference to FIGS. 1 and 1C, a second end frame 68 attaches to the lateral portion 16 on the first end 17 of the component 12. The second end frame 68 connects between the back side elongate member 18 and the front side elongate member 32. A panel 71 attaches to the first front side elongated member 22 and closes the front side 23 of the lateral portion 16.

Referring again to FIGS. 1 and 1A, a back frame 70 attaches to the corner portion 14 and the lateral portion 16 on the back side 21. The back frame 70 is an A-shape framing of an upper member 72, a plurality of spaced-apart intermediate supports 75, and a lower member 79 at a base of the A-frame 70. The intermediate supports 75 in the illustrated embodiment each have a vertical post 74 with an inwardly oriented support 76 connected by a lateral support member 77. The supports 76 orient at an oblique angle to the vertical posts 74 and connect to a longitudinal member 79 positioned inwardly of the back side 21. A backing sheet (not illustrated) may overlie and attach to the supports 76. The end frame 68 includes a corresponding angled surface 78. The back frame 70 supports foam bodies and padding (not illustrated) conventionally for seating cushions of a seating sectional furniture piece.

The foam bodies and padding (not illustrated) conventionally attach to the unitary component 12 for seating cushions and backs of a seating sectional furniture piece. Particularly, the foam bodies and padding attach to the end frame 58 and the back frame 70 and to supporting portions of the foundation members 44, 46, 48 and 50 of the component 12. The foundation may include a spring support, transverse straps or members and the like for conventionally supporting a cushioned seating surface. The component 12 is then conventionally enclosed with upholstery.

Sectional connectors may attach to one or both of the respective end face 17 or front face 23 of the unitary component 12, for example, to the front panels 66, 67 of the corner portion 14 and/or to the second end frame 68. The sectional connectors may be conventional mating connectors of a type for joining adjacent members or component furniture pieces; for example, a U-shaped receiving bracket and outwardly disposed plate that attach to respective opposing adjacent side faces of adjacent sectional modules or pieces. The bracket slidingly receives the plate to join the adjacent sectional modules together. The sectional connectors enable joinder of adjacent sectional seating modules.

Mating sectional connectors join adjacent modular components to assemble a seating furniture.

The unitary component 12 illustrated in FIG. 1 and FIGS. 1A-1C provides a framing that forms a seating sectional module with back supports 58, 70 for cushions and with an open end 17 and open front side 23 (along the panel 65 of the corner portion 14 and the panel 71 of the lateral portion 16), for persons to sit on the furniture piece.

The foundation member 46 provides a transitional support for both the corner portion 14 and for the elongate portion 16. This member 46 in cooperation with the spanning member 18 reduces the material and labor for manufacture of a sectional seating apparatus.

In reference to the illustrative embodiment shown in FIG. 1 and FIGS. 1A-1C, the frame provides the unitary modular furniture component 10 readily cushioned and upholstered for a sectional seating apparatus readily connectable to other of the component 10 or other modular furniture pieces. The unitary component 10 comprises the corner portion 14 having a foundation with the first width 35 from the back side to the distal extent on the front side and the elongate lateral portion 16 having a foundation with the second width 37 from the back side to the front side, the second width 37 less than the first width 35. The transverse foundation member 46 commonly supports the opposing sides of the abutting or adjoining of the adjacent corner portion 14 and the lateral portion 16 intermediate a pair of opposing ends 17, 19 of the unitary component 12 whereby the corner portion and the lateral portion adjoin unitarily on opposing sides. In the illustrated embodiment, a bridge portion 36 of the front side orients at an oblique angle relative to the front side of the corner portion and the lateral portion, whereby a first edge of the bridge portion abuts an opposing edge of the front side of the lateral portion and an opposing second edge of the bridge portion abuts an opposing edge of the front side of the corner portion, which bridge portion defines the distal extent of the first width. Further, the front side of the corner portion in the illustrative embodiment extends in a plane parallel to the front side of the lateral portion, which plane is spaced-apart laterally by the oblique-oriented bridge portion of the front side of the corner portion. Further, the frame may comprise a plurality of mating connectors, with a first mating connector attached to a portion of the front side of the corner portion for connecting the corner portion to an adjacent seating frame having an opposing respective one of the mating connectors. Also, the lateral portion defines an end side. One of the first mating connectors attaches to the end side of the lateral portion for connecting to an adjacent seating frame having an opposing respective one of the mating connectors. Typically, a pair of mating connectors are mounted in spaced relation on the respective side portion of the corner portion front side and the end side of the lateral portion, for mating engagement with aligned connectors mounted to the to-be-attached other modular furniture component 10 or other sectional furniture module piece.

Figure 2:
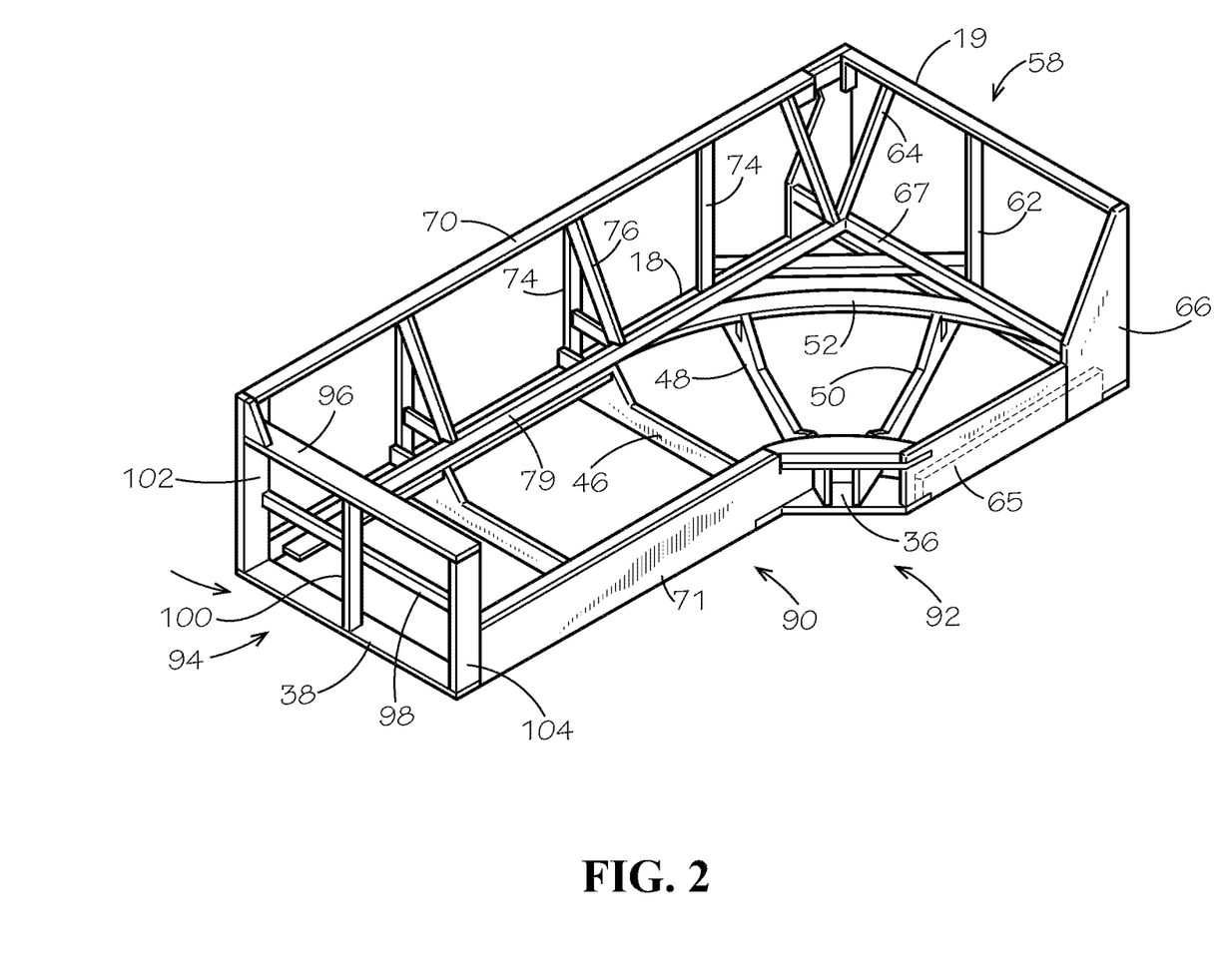
FIG. 2 illustrates in perspective view a frame for a second embodiment of a unitary component for a sectional seating apparatus in accordance with the present invention.
Figure 2A:
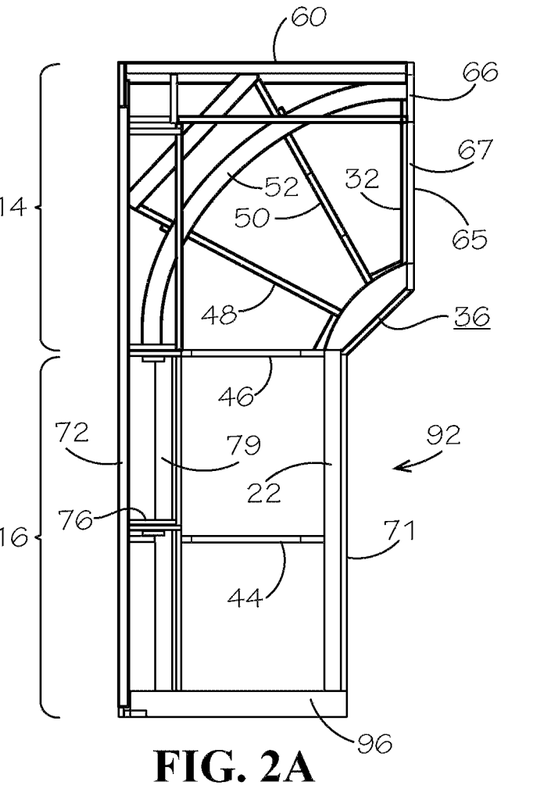
FIG. 2A illustrates in top plan view the frame shown in FIG. 2.
Figure 2B:
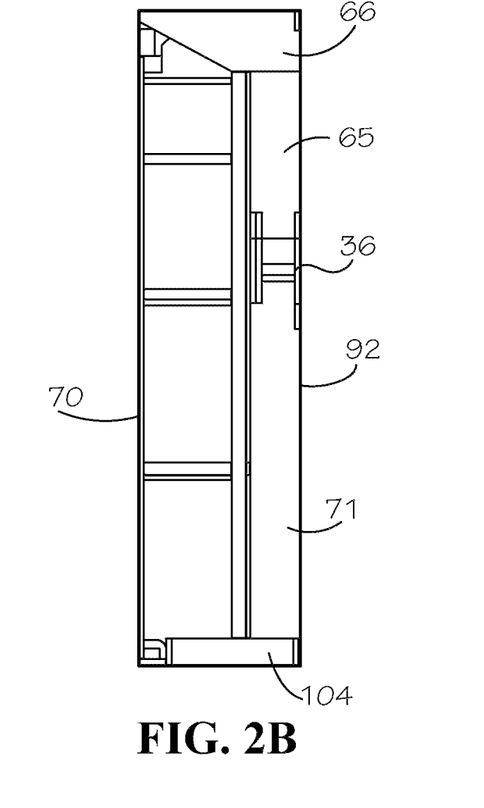
FIG. 2B illustrates in right side elevational view the frame shown in FIG. 2.
Figure 2C:
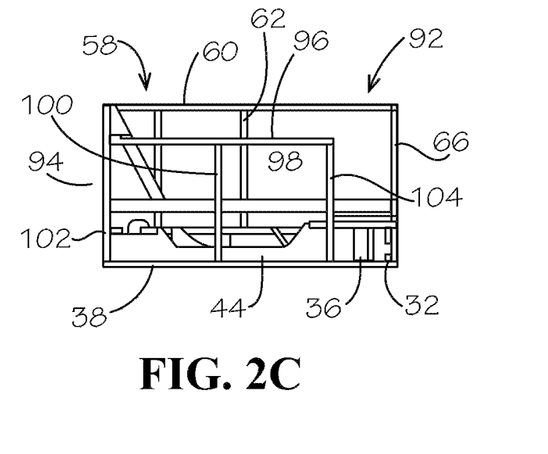
FIG. 2C illustrates in end elevational view the frame shown in FIG. 2.

FIG. 2 illustrates in perspective view a frame 90 for a second embodiment of a unitary component 92 for a sectional seating apparatus in accordance with the present invention. Further, FIG. 2A illustrates in top plan view the frame 90 shown in FIG. 2, FIG. 2B illustrates the frame 90 in right side elevational view, and FIG. 2C illustrates the frame in end elevational view. The frame 90 corresponds to the frame 12 discussed above in reference to FIGS. 1 and 1A-1C, except for replacing the end frame 68 with an arm frame assembly 94. The arm frame assembly 94 includes the end elongate member 38, an opposing upper lateral member 96, an intermediate lateral member 98 and a vertical support 100, and opposing back and front posts 102, 104. The frame 90 provides an arm-closed end 176A to the lateral component 16.

Figure 3:
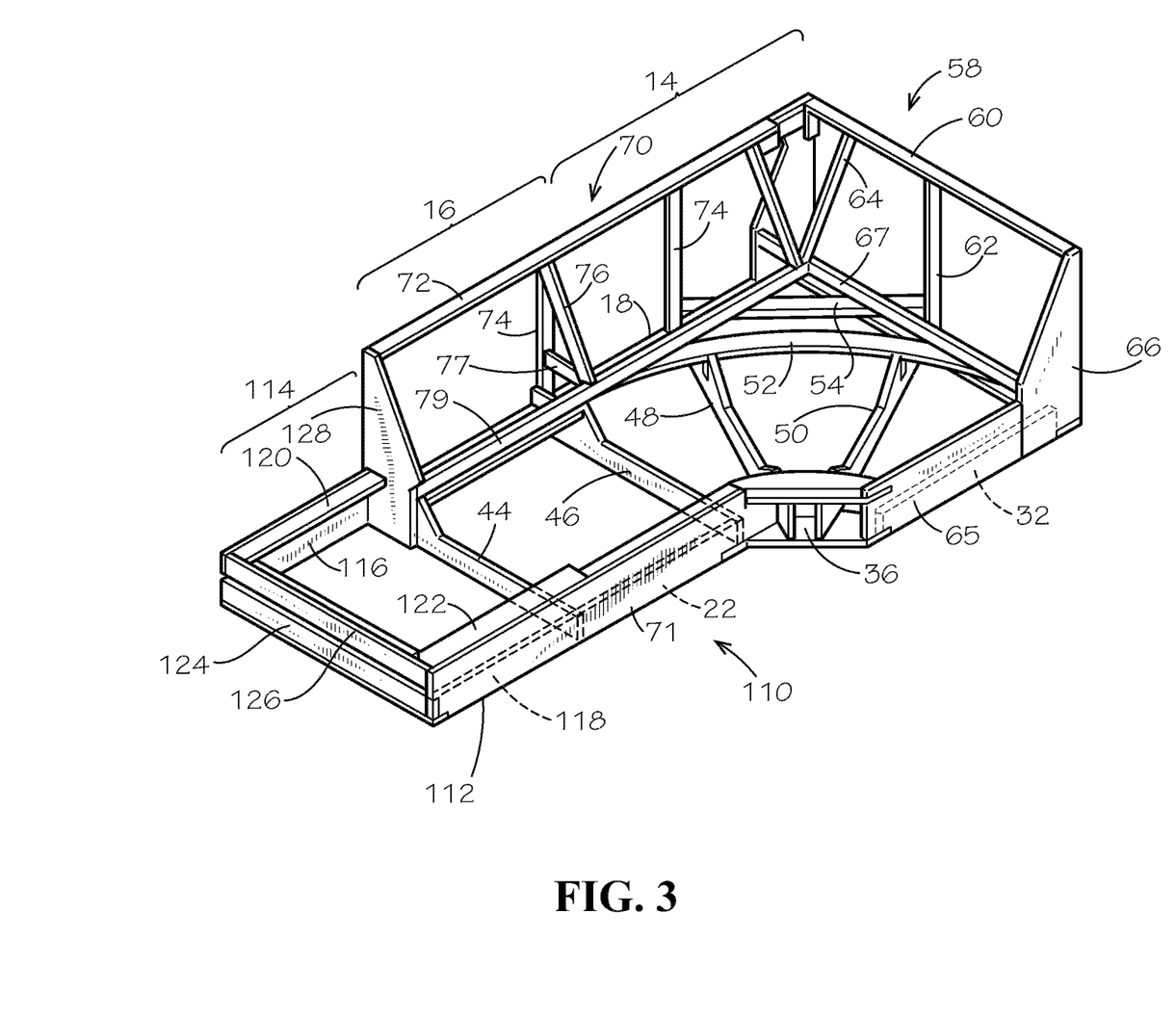
FIG. 3 illustrates in perspective view a frame for a third embodiment of a unitary component for a sectional seating apparatus in accordance with the present invention.
Figure 3A:
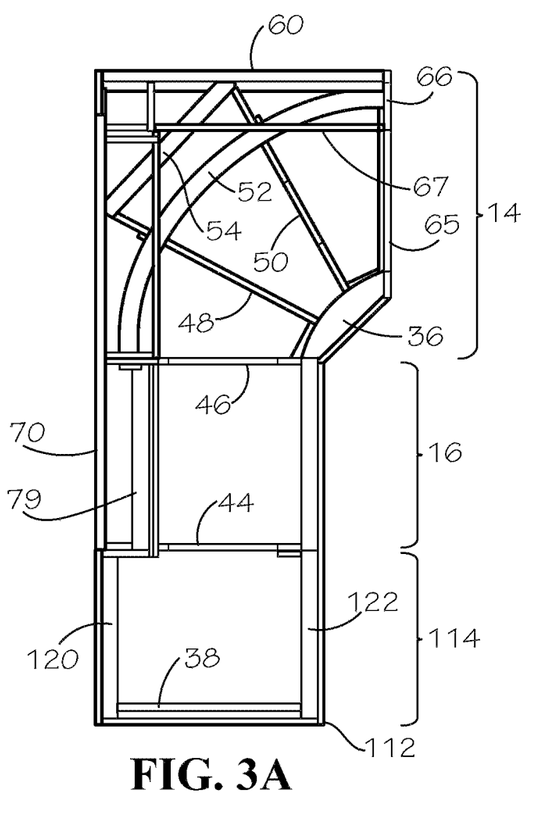
FIG. 3A illustrates in top plan view the frame shown in FIG. 3.
Figure 3B:
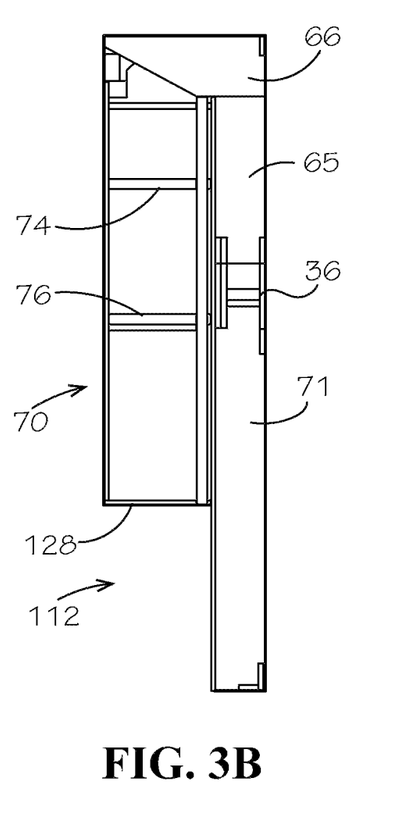
FIG. 3B illustrates in right side elevational view the frame shown in FIG. 3.
Figure 3C:
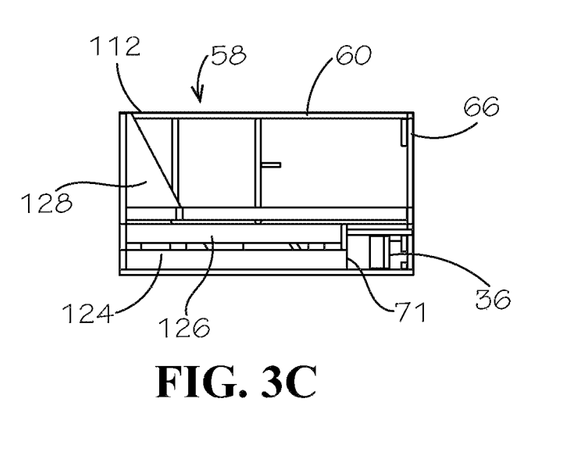
FIG. 3C illustrates in end elevational view the frame shown in FIG. 3.

FIG. 3 illustrates in perspective view a frame 110 for a third embodiment of a unitary component 112 for a sectional seating apparatus in accordance with the present invention. FIG. 3A illustrates the frame 110 in top plan view, FIG. 3B illustrates the frame in right side elevational vie2, and FIG. 3C illustrates the frame in end elevational view. The frame 110 corresponds to the frame 12 discussed above in reference to FIG. 1, except that the end of the lateral portion 16 terminates in a seating extension frame 114. The seating extension frame 114 includes back and opposing front members 116, 118 with upper and front supports 120, 122. Opposing lower and upper lateral members 124, 126 connect between the respective distal ends of the back member 116 and support 120 and the front member 118 and support 122. An end piece 128 attaches to the outside face of the foundation member 44 for defining the end of the back frame 70. The elongate front panel 71 attaches to the front member 118 and front member 22.

The unitary components 12, 92 and 112 accordingly each provide the unitary sectional component having the corner portion 14 and the elongate portion 16, which sectional component is readily stored, handled, and shipped as a single one-piece furniture module that readily attaches to other modular pieces for a sectional furniture seating assembly. The present novel sectional component provides an improved sectional furniture apparatus with the unitary corner and elongate lateral portions 14, 16 respectively which reduces the number of modular units required for a sectional furniture assembly and provides efficiencies in materials usage and manufacture, as well as in storage, shipping, and end-user joinder and assembly of the sectional furniture seating. The materials usage particularly eliminates duplicate end assemblies for each adjacent corner 14 and elongate lateral portion 16 but rather provides the common supporting elongate member 47 in the foundation. Particularly, the foundation member 46 commonly supports a side edge of the corner portion 14 and a side edge portion of the lateral portion 16 intermediate opposing ends 17 19 of the unitary component. The present invention further experiences cost saving arising from the reduced amount of upholstery as common opposing sides of the adjacent component units are eliminated. The unitary component of the present invention further has reduced labor costs for assembly of the unitary component frame, installation of cushioning padding and upholstery.

The disclosed unitary component fame 12, 92, and 112 is disclosed and described in three different illustrative embodiments. FIG. 1 illustrates the unitary component 12 of the corner portion 14 with the lateral unit 16 for seating, and which is open on both the end 17 of the lateral portion 16 and the front side 23 of the lateral and corner portion 14 for selective attaching with sectional module seating units on either the end or the corner portion front side or both. FIG. 2 illustrates the unitary component 92 with the corner section 14 and the elongate lateral portion 16 that has the arm assembly 94 at the end 17, and the opposing end 19 may selectively attach to an adjacent sectional module seating unit laterally attached to the front face 23 of the corner portion 14. FIG. 3 illustrates the unitary component 112 of the corner portion 14 with a chaise portion 114 outwardly longitudinally on the open 17 of the lateral portion 16 and the opposing end 19 may selectively attach to an adjacent sectional module seating unit attached laterally to the front face 23 of the corner portion 14. The unitary components 12, 92 and 112 may be used in various combinations attached with mating connectors on the faces of the end 17 or the side 23 of the corner portion 14 to other sectional module units as shown in the exemplary but not limiting sectional seating assemblies illustrated in FIGS. 4-8.

Figure 4:
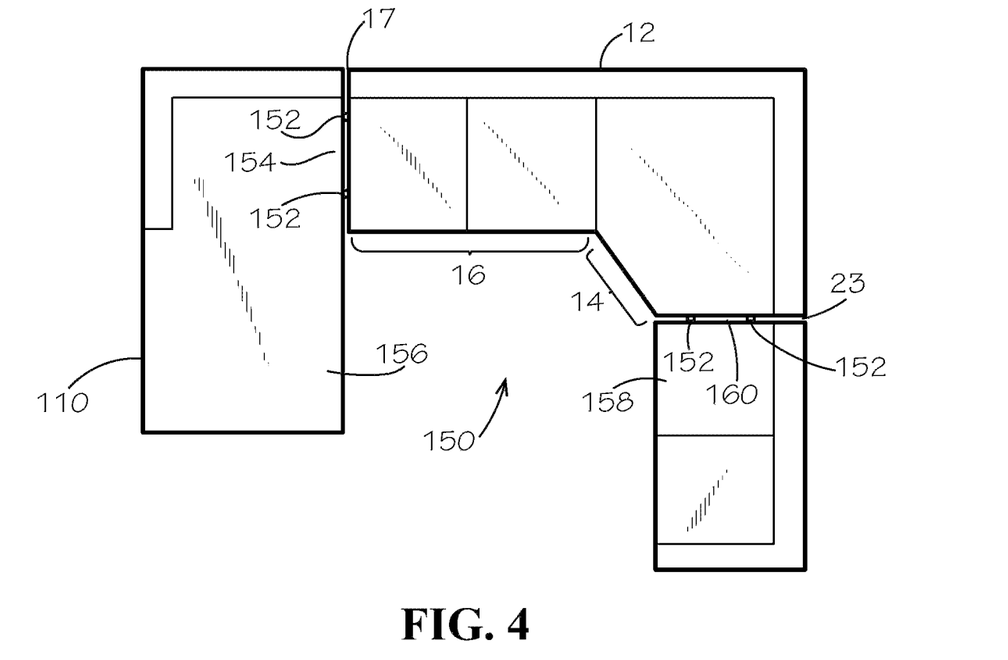
FIG. 4 illustrates a first sectional seating assembly using one of more of the embodiments of the unitary component in an assembled configuration.

FIG. 4 illustrates a first sectional seating assembly 150 that uses the unitary component 12 illustrated in FIG. 1 with two additional furniture modules 156 and 158. The furniture modules 156 and 158 are elongated chaise-type seating modules. The foundation of the module 156 may be a variation of the chaise-type unitary component 12 illustrated in FIG. 2, modified to replace the bridge 36 with an elongated member for the first and second members 22, 32, or alternatively, the bridge is disposed coaxial with the members 22, 32. A front face 154 includes mating connectors so that the opposing faces of the end 17 and face 154 connect together. The furniture module 158 is a modification of the unitary component 12 to similarly replace the bridge 36 with an elongated member for the first and second members 22, 32, or alternatively, the bridge is disposed coaxial with the members 22, 32. A side face 160 of the module 158 includes mating connectors 152, so that the opposing faces 23, 160 of the components 12 and 158 connect adjacently. Thus, the unitary component 12 includes section module connectors 152 attached at the end 17 and at the front side 23 on the corner portion 14. The end 17 opposes and interconnects to the furniture module 156 that has mating connectors 152 on a side 154 opposing the end 17. The seating module 158 attaches with a mating connector 152 to the front side 23 of the unitary component 12. The assembly 150 provides the combined furniture of the chaise-type seating joined to the lateral and corner module, and the arm-rest seating module.

Figure 5:
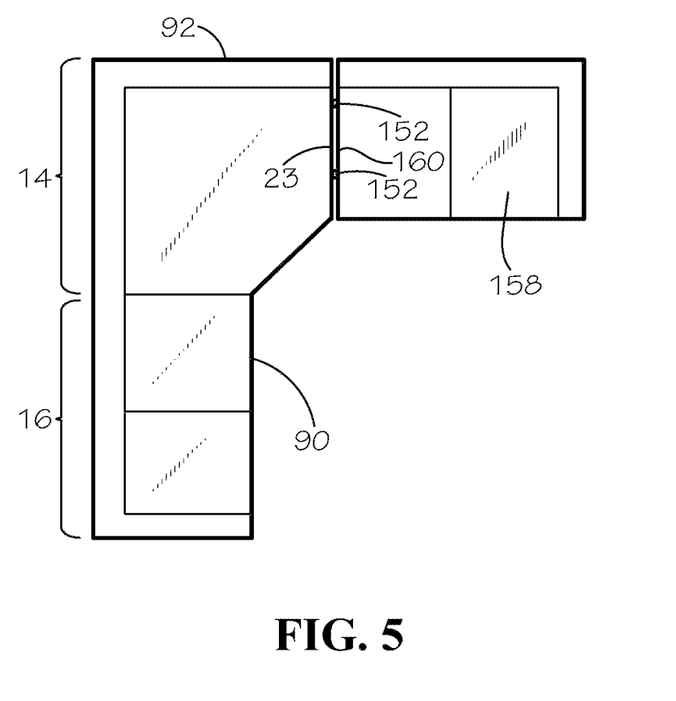
FIG. 5 illustrates a second sectional seating assembly using one of more of the embodiments of the unitary component in an assembled configuration.

FIG. 5 illustrates a second sectional seating assembly 160 in an assembled configuration using the unitary component 92 shown in FIG. 2 having the arm 94 and attached at the open end 23 to the seating assembly modular unit 158.

Figure 6:
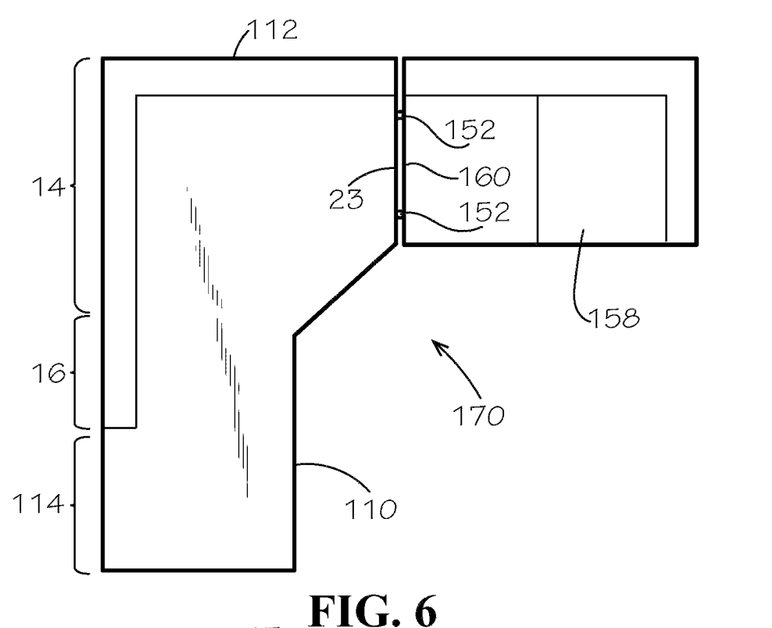
FIG. 6 illustrates a first sectional seating assembly using one of more of the embodiment s of the unitary component in an assembled configuration.

FIG. 6 illustrates a third sectional seating assembly 170 in an assembled configuration using the unitary component 112 with the seating assembly modular piece 158. The modules 112, 158 interconnect with the mating connectors 152 attached to facing surfaces 23, 160.

Figure 7:
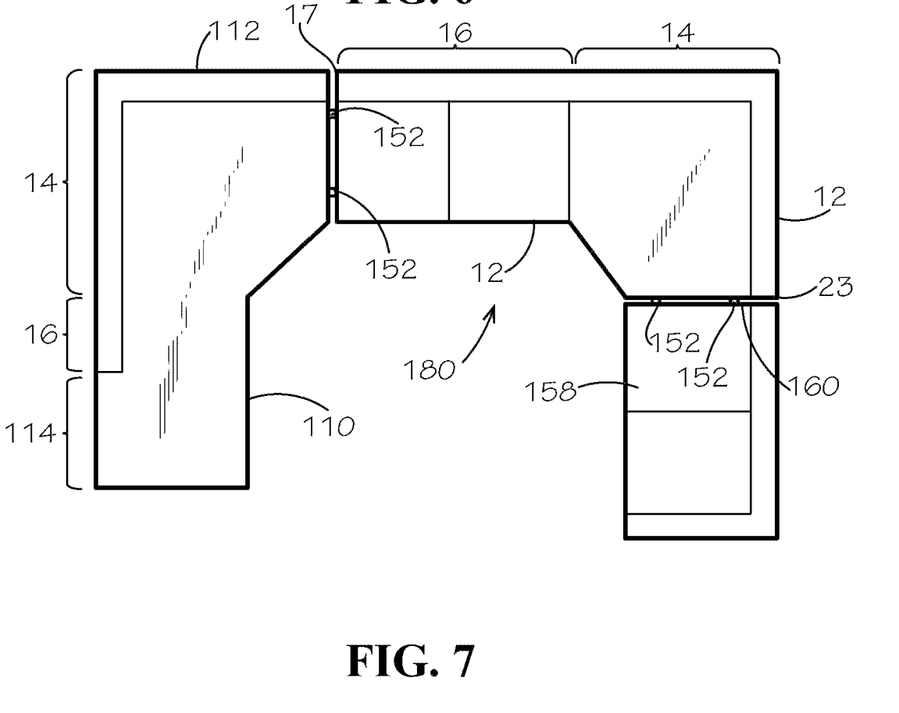
FIG. 7 illustrates a first sectional seating assembly using one of more of the embodiment s of the unitary component in an assembled configuration.

FIG. 7 illustrates a fourth sectional seating assembly 180 in an assembled configuration using the unitary component 12 attached at the second end 19 on the face 23 to the face 160 of the modular piece 158 and at the opposing first end 17 to the face 23 of the unitary component 112. The open side of the lateral portion 16 of the component 12 thus adjoins the front face 23 of the adjacent unitary component 112. The seating assembly module 158 attaches with mating connectors 152 at an open end connecting to the front face 23 of the unitary component 12.

Figure 8:
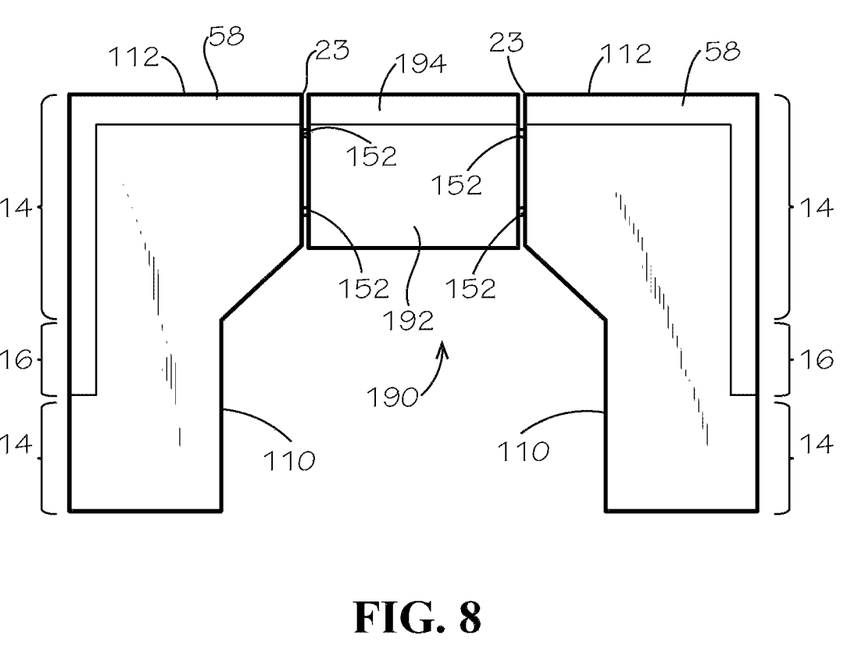
FIG. 8 illustrates a first sectional seating assembly using one or more of the embodiments of the unitary component in an assembled configuration.

FIG. 8 illustrates a fifth sectional seating assembly 190 in an assembled configuration using two of the unitary components 112 in a right-hand and a left-hand configuration joined together by an intermediate seating assembly modular unit 192 that is armless but having a cushioned back 194 co-axial with the back assemblies 58 of the unitary components 112. The left-hand configuration 112b is a mirror of the right-hand configuration 112. The opposing side faces 23 of the components 112 have connectors that matingly engage connectors on the side faces of the modular unit 192.

The foregoing has disclosed modular components readily arranged in selected configurations for providing selectively a corner seating area, an chaise seating area, and a corner seating area with a smaller lateral seat portion having an arm-rest end, for sectional furniture assembly, which corner/lateral foundation provides the transitional support 16 for both the corner portion 14 and for the elongate lateral portion 16, and in cooperation with the spanning member 18 reduces the material and labor for manufacture of a sectional seating apparatus. The modular components described above can be adapted, modified, and combined to provide further embodiments in accordance with the present invention of the frame foundation for a unitary component readily connected to other such frame foundations in assembly of a selected sectional seating furniture. While this invention has been described in detail with particular reference to illustrative, non-limiting embodiments thereof, the principles and modes of operation of the present invention have been described in the foregoing specification. The invention is not to be construed as limited to the particular forms disclosed because these are regarded as illustrative rather than restrictive. Moreover, those skilled in the art may make modifications, variations and changes thereto without departure from the spirit and scope of the invention as described by the following claims.

What is claimed is:

1. A frame for a unitary component formed as a single permanent and rigid frame of a sectional seating apparatus, comprising:
   a corner portion having foundation members including a front member and an end side member;
   an elongate lateral portion having foundation members including a front member and an end side member, wherein the corner portion has a back-to-front first width and the elongate lateral portion has a back-to-front second width, the first width greater than the second width;
   an interconnection connecting a respective opposing edge of the front member of the corner portion and the front member of the elongate lateral portion;
   a longitudinal foundation member spanning along a back side of both the corner portion and the elongate lateral portion; and
   a transverse foundation member spanning from the back side to the interconnection and commonly supporting an interior portion of the corner portion and an opposing interior portion of the elongate lateral portion, the transverse foundation member being intermediate and spaced from each of the opposing end side member of the corner portion and the end side member of the elongate lateral portion, to form the unitary component as the permanent and rigid frame.

2. The frame as recited in claim 1, wherein the elongate lateral portion has a side arm assembly at a distal end opposing the transverse foundation member.

3. The frame as recited in claim 1, further comprising:
   a seat back assembly attached to the back side; and
   a seating assembly attached at a distal end of the elongate lateral portion, said seating assembly extending longitudinally beyond a distal end of said seat back assembly.

4. The frame as recited in claim 1, wherein the interconnection comprises a bridge disposed at an oblique angle relative to a front side of the elongate lateral portion.

5. The frame as recited in claim 1, further comprising a plurality of mating connectors, a respective pair of which mating connectors attach to respective opposing faces of a pair of the frames for connecting said pair of frames together.

6. A frame for a unitary component formed as a single permanent and rigid frame of a sectional seating apparatus, comprising:

a back side member;

a corner portion connected to the back side member and having foundation members and a corner portion exterior side, with a first width from the back side member to a corner portion front side;

an elongate lateral portion connected to the back side member and having foundation members and a lateral portion exterior side opposing the corner portion exterior side, with a second width from the back side member to a lateral portion front side, the second width less than the first width;

an interconnection connecting a respective opposing edge of the corner portion front side and the lateral portion front side; and a transverse foundation member spanning from the back side member to the interconnection and commonly supporting an interior portion of the corner portion and an opposing interior portion of the elongate lateral portion, the transverse foundation member being intermediate and spaced from each of the corner portion exterior side and the lateral portion exterior side, whereby the corner portion and the elongate lateral portion adjoin together on the opposing interior portions, to form the unitary component as the permanent and rigid frame.

7. The frame as recited in claim 6, wherein the interconnection comprises a bridge disposed at an oblique angle relative to a front side of the elongate lateral portion, whereby a first edge of the bridge abuts an edge of the front side of the lateral portion and a second edge of the bridge abuts an edge of the front side of the corner portion.

8. The frame as recited in claim 7, wherein the front side of the corner portion defines a plane parallel to a plane defined by the front side of the lateral portion.

9. The frame as recited in claim 8, further comprising a plurality of mating connectors, a first mating connector attached to the front side of the corner portion for connecting the corner portion to an adjacent seating frame having an opposing respective one of the mating connectors mounted in alignment therewith for mating connection.

10. The frame as recited in claim 6, wherein the elongate lateral portion defines an end side; and further comprising a plurality of mating connectors, a first mating connector attached to the end side of the lateral portion for connecting to an adjacent seating frame having an opposing respective one of the mating connectors mounted in alignment therewith for mating connection.

11. The frame as recited in claim 6, wherein the elongate lateral portion has a side arm assembly at a distal end opposing the corner portion.

12. The frame as recited in claim 6, further comprising a seat back assembly extending upwardly from a respective back side of the corner portion and the elongate lateral portion.

13. The frame as recited in claim 12, further comprising a seating assembly frame that extends longitudinally beyond a distal end of the seat back assembly on the elongate lateral portion.

14. The frame as recited in claim 6, wherein the interconnection comprises a bridge disposed at an oblique angle relative to a front side of the elongated lateral portion.

15. The frame as recited in claim 14, wherein the front side of the corner portion defines a plane parallel to a plane defined by the front side of the lateral portion.

16. The frame as recited in claim 6, further comprising a plurality of pairs of mating connectors, a respective pair of which mating connectors attach to respective opposing faces of a pair of the frame members for connecting said pair of frame members together.

* * * * *